3,405,096
PROCESS FOR THE PRODUCTION OF POLY(POLY-
    METHYLENE) TEREPHTHALATES
Jean Chambion and Paul Hilaire, Lyon, Rhone, France,
 assignors to Societe Rhodiaceta, Paris, France, a cor-
 poration of France
No Drawing. Filed Sept. 22, 1965, Ser. No. 489,389
Claims priority, application France, Sept. 24, 1964,
            989,213
       7 Claims. (Cl. 260—75)

This invention relates to the production of poly(poly-methylene) terephthalates.

Poly(polymethylene) terephthalates are linear polyesters which are of great value for the production of fibres and films. They are generally produced by a polycondensation reaction, effected by heating a suitable derivative of terephthalic acid which is capable of undergoing auto-condensation, such as a bis-(omega-hydroxy-n-alkyl) terephthalate. The derivative of terephthalic acid may be formed by any known process, for example by reacting a glycol with terephthalic acid or by means of an ester exchange reaction between a glycol and an ester of terephthalic acid.

The best known poly(polymethylene) terephthalate for the production of fibres and films is polyethylene terephthalate.

The process most commonly employed for the production of polyethylene terephthalate consists in first effecting ester exchange between dimethyl terephthalate and ethylene glycol, so as to form bis-(beta-hydroxyethyl) terephthalate, and then subjecting this compound to polycondensation by heating under reduced pressure.

Other processes for the production of polyethylene terephthalate consist in directly reacting terephthalic acid with ethylene glycol or ethylene oxide. The immediate product is again bis-(beta-hydroxyethyl) terephthalate, which is subjected to polycondensation.

To carry out this polycondensation in a reasonable time it is necessary to employ a catalyst. Many catalysts have been proposed for this purpose, but the majority of them have disadvantages in that they favour not only the polycondensation, but also the degradation of the polymer formed, or they impart to the latter a discoloration or cloudy appearance. The production of fibres requires a polymer having as white a colour as possible, and the production of films requires a polymer which is as clear and transparent as possible.

The most commonly employed catalyst is antimony oxide, by means of which it is possible to effect the polycondensation at an acceptable speed, but which has the disadvantage of being rather sparingly soluble in the reaction mixture, especially having regard to the fact that it must be employed in substantial proportions in order to obtain a sufficient catalytic effect.

The present invention comprises a process for the production of poly(polymethylene) terephthalates, which comprises effecting polycondensation of a bis-(omega-hydroxy-n-alkyl) terephthalate, in the presence of a catalyst of bismuth aminotriethanolate.

This compound has the formula:

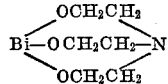

and is described by W. T. Miller, in J. Am. Chem. Soc. 62, 2707–2709 (1940).

Various bismuth compounds have already been proposed as polycondensation catalysts for bis-(omega-hydroxy-n-alkyl) terephthalates, such as the oxide, weak acid salts such as the formate, acetate, oxalate, stearate and phthalate and salts of volatile acids, such as the chloride and nitrate, but the applicants have found that bismuth aminotriethanolate has a distinctly more pronounced catalytic effect than the bismuth salts previously proposed. It also has a well-defined chemical composition, so that it can be introduced into the polycondensation in precise and reproducible proportions; this is not the case with some other compounds of bismuth, for example the oxide, which is always more or less hydrated.

As compared with antimony oxide, bismuth aminotriethanolate has the advantage of being highly soluble in the reaction mixture, and above all the advantage that it can be employed in a much smaller quantity, with the same, or even a greater, catalytic effect. It has been observed that quantities of bismuth aminotriethanolate of the order of 5 parts per million by weight of bismuth calculated on the monomer being polycondensed are sufficient to give satisfactory results, whereas quantities of antimony oxide of the order of 300 parts per million by weight of antimony, on the same basis are currently employed.

In the very frequent case where the bis-(omega-hydroxy-n-alkyl) terephthalate is obtained by an ester interchange reaction between an ester of terephthalic acid and a glycol, the bismuth aminotriethanolate may be added to the reactants either before or after the ester interchange, because it has no detrimental influence on the ester interchange reaction. Indeed it has been found to have slight catalytic activity, but it is recommended to use also a conventional ester interchange catalyst, such as calcium acetate or manganous acetate.

The quantities of bismuth aminotriethanolate employed, calculated in relation to the dimethyl terephthalate equivalent of the bis-(omega-hydroxy-n-alkyl) terephthalate starting material, may be between 5 and 200 parts per million by weight of bismuth. The catalytic effect is still exerted if the concentration of 200 parts per million is exceeded, but there is no particular advantage in doing so. Usually between 10 and 55 parts per million will be used. The polycondensation temperature is the usual temperature for the polycondensation of bis-(omega-hydroxy-n-alkyl) terephthalates. In particular, bis-(beta-hydroxyethyl) terephthalate is advantageously polycondensed at a temperature between 270° and 292° C.

The following examples are given by way of illustration.

In Examples 1 to 9, which are summarized in Table I, the polycondensation is carried out in the following manner:

An ester interchange reaction is first performed in a 10 litre round-bottomed glass flask between 3298 g. (17 moles) of dimethyl terephthalate and 2635 g. (42.5 moles) of ethylene glycol, in the presence of an ester interchange catalyst. After distilling off the methanol by-product and the excess of ethylene glycol, the reaction mass is transferred into a 7.5 litre autoclave provided with a stirring system. At this point there are added to the reactants, which are at a temperature of about 230° C., the polycondensation catalyst and 0.5% by weight, calculated on the polymer, of titanium dioxide, both in suspension in ethylene glycol. The reaction mass is then heated to 250°

C. with stirring at atmospheric pressure, while ethylene glycol is distilled off. Heating is thereafter continued from 250° C., to the temperature T chosen for the polycondensation, while the pressure in the autoclave is gradually lowered to about 2.5 mm. Hg. Finally, in a last phase, called the polycondensation phase in Table I, lowering of the pressure is continued to 0.2 mm. Hg, while the reaction mass is maintained at the temperature T. As may be seen from Table I the duration of this last phase varies with the nature and quantity of the catalyst, and with the temperature T. In particular, comparison of Examples 3, 8 and 9 shows the superiority of the catalytic activity of bismuth aminotriethanolate over those of two other bismuth compounds, namely the oxide and the acetate. It is found that the polymer obtained with bismuth oxide has an intrinsic viscosity which is distinctly lower than that of the polymer obtained with bismuth aminotriethanolate. In the case of bismuth acetate, the intrinsic viscosity is the same, but the time required for the polycondensation phase is distinctly longer.

distinctly lower proportion of catalyst in the same polycondensation time.

The catalytic superiority of bismuth aminotriethanolate over antimony oxide has been confirmed on an industrial scale in operations carried out in a 2000 litre autoclave, starting with 1150 kg. of dimethyl terephthalate and 720 kg. of ethylene glycol. Examples 12 and 13 (summarized in Table III) show the operating conditions and the results obtained (polymers delustered with 0.5% by weight of titanium oxide).

We claim:

1. Process for the production of poly(polymethylene) terephthalates, which comprises effecting polycondensation of a bis-(omega-hydroxy-n-alkyl) terephthalate in the presence as catalyst of bismuth aminotriethanolate.

2. Process according to claim 1, wherein the polycondensation is effected in the presence of 5–200 parts per million of the catalyst (reckoned as bismuth) based on the weight of the terephthalate (reckoned as dimethyl terephthalate).

TABLE I

| Example No. | Ester interchange catalyst | | Polycondensation catalyst | | Polycondensation phase | | Characteristics of the polymer | | |
|---|---|---|---|---|---|---|---|---|---|
| | Nature | Quantity (g.) | Nature | Proportion [1] | T., °C. | Duration in min. | Intrinsic viscosity [2] | G. T. COOH [3] | P. R., °C. [4] |
| 1 | Manganous acetate | 1.590 | $Bi(OCH_2CH_2)_3N$ | 55 | 285 | 65 | 0.66 | 29 | 259 |
| 2 | do | 1.590 | $Bi(OCH_2CH_2)_3N$ | 20 | 285 | 70 | 0.66 | 28 | 260 |
| 3 | do | 1.590 | $Bi(OCH_2CH_2)_3N$ | 10 | 285 | 70 | 0.67 | 32 | 261 |
| 4 | do | 1.590 | $Bi(OCH_2CH_2)_3N$ | 10 | 275 | 135 | 0.71 | 35 | 260 |
| 5 | Zinc acetate | 0.590 | $Bi(OCH_2CH_2)_3N$ | 10 | 275 | 95 | 0.65 | 29 | 260 |
| 6 | Calcium acetate | 2.810 | $Bi(OCH_2CH_2)_3N$ | 20 | 285 | 115 | 0.66 | 23 | 261 |
| 7 | Manganous hypophosphite | 1.913 | $Bi(OCH_2CH_2)_3N$ | 20 | 280 | 155 | 0.58 | 23 | 262 |
| 8 | Manganous acetate | 1.590 | $Bi_2O_3$ | 10 | 285 | 75 | 0.56 | 51 | 260 |
| 9 | do | 1.590 | Bismuth acetate | 10 | 285 | 105 | 0.67 | 23 | 259 |

[1] Parts by weight per million of bismuth calculated on the dimethyl terephthalate.
[2] Intrinsic viscosity determined at 25° C. on 0.5% weight-by-volume solution of polymer in 0-chlorophenol.
[3] G. T. COOH=Number of terminal COOH groups per ton of polymer.
[4] P. R.=Softening point measured by penetrometry (the principle of the determination is explained by O. B. Edgar and E. Ellery, J. Chem. Soc. 2633–2638 (1952)).

TABLE II

| Example No. | Ester interchange catalyst | | Polycondensation catalyst | | Polycondensation phase | | Characteristics of the polymer | | |
|---|---|---|---|---|---|---|---|---|---|
| | Nature | Quantity (g.) | Nature | Proportion [1] | T., °C. | Duration in min. | Intrinsic viscosity [2] | G. T. COOH [3] | P. R., °C. [4] |
| 10 | AMZ [5] | 37.95 | $Bi(OCH_2CH_2)_3N$ | 10 | 275 | 125 | 0.63 | 90 | 234 |
| 11 | AMZ | 37.95 | $Sb_2O_3$ | 340 | 275 | 125 | 0.50 | 101 | 239 |

[1] Parts by weight per million of bismuth or antimony in relation to the dimethyl terephthalate.
[2][3][4] Same meanings as in Table I.
[5] AMZ=Zinc and methyl adipate.

TABLE III

| Example No. | Ester interchange catalyst | | Polycondensation catalyst | | Polycondensation phase | | Characteristics of the polymer | | |
|---|---|---|---|---|---|---|---|---|---|
| | Nature | Proportion [1] | Nature | Proportion [1] | T., °C. | Duration | Intrinsic viscosity | G. T. COOH [3] | P. R., °C. [4] |
| 12 | Manganous acetate | 110 | $Bi(OCH_2CH_2)_3N$ | 10 | 285 | 3 h. 35 min. | 0.67 | 30 | 263 |
| 13 | do | 110 | $Sb_2O_3$ | 340 | 285 | 3 h. 55 min. | 0.67 | 30 | 262 |

[1] Parts by weight per million of bismuth or antimony in relation to the dimethyl terephthalate.
[2][3][4] Same meanings as in Table I.

Examples 10 and 11, which are summarized in Table II, concern the preparation of a polyethylene terephthalate modified by adding zinc and methyl adipate to the initial reactants, i.e. methyl terephthalate and ethylene glycol, in accordance with French Patent 1,352,243. Such a modified polyester has in particular a better dyeing affinity for plastosoluble dyestuffs.

In these two examples, the preparation of the polyester is carried out as in Examples 1–9, and with the same quantities of ethylene glycol and dimethyl terephthalate. The zinc and methyl adipate (which perform the function of an ester interchange catalyst) are simply added to the initial reaction mixture.

These two examples clearly show the superiority of bismuth aminotriethanolate over antimony oxide in that it gives a product of higher intrinsic viscosity with a 3. Process according to claim 1, wherein the polycondensation is effected in the presence of 10–55 parts per million of catalyst (reckoned as bismuth) based on the weight of the terephthalate (reckoned as dimethyl terephthalate).

4. Process according to claim 1, wherein polyethylene terephthalate is made by the polycondensation of bis-(beta-hydroxyethyl) terephthalate.

5. Process according to claim 1, wherein the bis-(omega-hydroxy-n-alkyl) terephthalate is made by an ester interchange reaction between a dialkyl terephthalate and a glycol, and the bismuth aminotriethanolate is present during the ester interchange reaction.

6. Process according to claim 4, wherein bis-(beta-hydroxyethyl) terephthalate is made by ester interchange between dimethyl terephthalate and ethylene glycol, and the bismuth aminotriethanolate is present during the ester interchange reaction.

7. Process according to claim 6, wherein the polycondensation is effected in the presence of 10–55 parts per million of catalyst (reckoned as bismuth) based on the weight of the terephthalate (reckoned as dimethyl terephthalate).

References Cited

UNITED STATES PATENTS 3,074,818   1/1963   Lee.

WILLIAM H. SHORT, *Primary Examiner.*

L. P. QUAST, *Assistant Examiner.*